(12) United States Patent
Jeong et al.

(10) Patent No.: US 9,068,309 B2
(45) Date of Patent: Jun. 30, 2015

(54) APPARATUS AND METHOD FOR SIMULATING SUBMARINE LANDSLIDE RESULTING FROM GAS HYDRATE DISSOCIATION OR EARTHQUAKE

(71) Applicant: KOREA INSTITUTE OF GEOSCIENCE AND MINERAL RESOURCES, Daejeon (KR)

(72) Inventors: Sueng Won Jeong, Busan (KR); Sung-Sik Park, Daegu (KR); Gil Young Kim, Daejeon (KR); Jang-Jun Bahk, Daejeon (KR); Seong-Pil Kim, Daejeon (KR); Sang Hoon Lee, Seoul (KR)

(73) Assignee: KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 131 days.

(21) Appl. No.: 13/922,657

(22) Filed: Jun. 20, 2013

(65) Prior Publication Data
US 2014/0227036 A1     Aug. 14, 2014

(30) Foreign Application Priority Data
Feb. 13, 2013  (KR) .................. 10-2013-0015554

(51) Int. Cl.
*E02B 1/02*       (2006.01)
*G09B 23/40*   (2006.01)

(52) U.S. Cl.
CPC .. *E02B 1/02* (2013.01); *G09B 23/40* (2013.01)

(58) Field of Classification Search
USPC ....................................... 405/79, 52
See application file for complete search history.

(56) References Cited

FOREIGN PATENT DOCUMENTS

| | | | |
|---|---|---|---|
| CN | 102331489 A | * | 1/2012 |
| CN | 103869046 A | * | 6/2014 |
| KR | 10-0878139 A | | 1/2009 |

* cited by examiner

*Primary Examiner* — Benjamin Fiorello
*Assistant Examiner* — Kyle Armstrong
(74) *Attorney, Agent, or Firm* — Maxon IP LLC.; Justin H. Kim

(57) ABSTRACT

Disclosed herein is an apparatus and method for simulating a submarine landslide. The apparatus includes an inclined flume; a plurality of sedimentary layers which are stacked on top of one another in the flume and tapped; water which is charged into the flume on the sedimentary layers in such a way that the surface of the water is formed in the flume; and a plurality of injectors which are provided in a bottom of the flume so as to be movable upwards or downwards with respect to the flume and inject gas or water into the sedimentary layer. The sedimentary layers are changed in pressure and temperature by the gas or water injected from the injectors into the sedimentary layers so that an artificial slope collapse is caused, whereby a water wave is generated in the flume.

12 Claims, 15 Drawing Sheets

APPARATUS AND METHOD FOR SIMULATING SUBMARINE LANDSLIDE RESULTING FROM GAS HYDRATE DISSOCIATION OR EARTHQUAKE

CROSS-REFERENCE TO RELATED APPLICATIONS

This application claims priority to and the benefit of Korean Patent Application No. 10-2013-0015554 filed in the Korean Intellectual Property Office on Feb. 13, 2013, the entire contents of which are incorporated herein by reference.

BACKGROUND

1. Field of the Invention

The present invention relates generally to apparatuses and methods for simulating submarine landslides and, more particularly, to an apparatus and method for simulating a submarine landslide or a debris flow which is caused in an actual seabed by dissociation of gas hydrate or an earthquake.

2. Description of the Related Art

A submarine landslide is a generic term for landslides that occur in submarine environments. Submarine landslides include activity (slides) or diffusion of a seabed, rockslides, debris flow, etc. Such submarine landslides occur in a variety of submarine environments, for example, in a continental shelf slope and rise, a sea loch or lake, a submarine canyon, an inland sea, an estuary, a delta, a volcanic island, etc. Submarine landslides are mainly caused by earthquakes, dissociation of gas hydrate, an unconsolidated layer being formed during a sedimentary layer forming process, subsurface water penetration, abrupt sea level variation, etc. In the deep sea, dissociation of gas hydrate and earthquakes are responsible for the majority of submarine landslide occurrences.

Compared to landslides on land, the occurrence scale and damage degree of submarine landslides are relatively large, thus posing a severe danger to humans. In the same manner as a landslide on land, a variety of causes may trigger a slide (land activity) in an unstable seabed and markedly reduce shearing strength which affects the ground stability. Collapsed submarine landslide substances create debris flow which flows downwards in a fluidized form.

The scales and travel distances of submarine landslides are about 100 to 1000 times those of landslides on land. Therefore, damage, which is caused by water waves resulting from a submarine landslide, and impact force, which is applied to the coastal area by submarine debris flow, are also very large. Furthermore, if methane gas produced by natural or artificial dissociation of gas hydrate is released from a deep seabed into the atmosphere without being burned, a serious greenhouse effect that is about 20 times more damaging than that of released carbon dioxide may be caused. In addition, during a process of drilling for gas hydrate, which is a natural energy source, a seabed in which gas hydrate is present is disturbed, thus making a deep sea stratum unstable. Thereby, a geological disaster may be caused.

An apparatus for simulating a landslide was proposed in Korean Patent Application No. 10-2008-0066805. This apparatus can measure the possibility of the occurrence of a landslide on the ground and the range and size of damage caused by the landslide. However, the testing apparatus is problematic in that it cannot simulate a submarine landslide.

Given this, a separate apparatus, which can simulate a submarine landslide caused by dissociation of gas hydrate or an earthquake and easily measure the scale the submarine landslide, the mobility of debris flow, a debris flow deposition pattern, heights and speed of water waves (for example, a tsunami), is required.

SUMMARY OF THE DISCLOSURE

Accordingly, the present invention has been made keeping in mind the above problems occurring in the prior art, and an object of the present invention is to provide an apparatus and method which simulate a submarine landslide which is caused by dissociation of gas hydrate or an earthquake and measure the scale of the submarine landslide, the mobility of debris flow, a debris flow deposition pattern and heights and speed of water waves.

In order to accomplish the above object, in an aspect, the present invention provides an apparatus for simulating a submarine landslide, including: an inclined flume; a plurality of sedimentary layers stacked on top of one another in the flume, the sedimentary layers being tapped; water charged into the flume on the sedimentary layers in such a way that a surface of the water is formed in the flume; and a plurality of injectors provided in a bottom of the flume so as to be movable upwards or downwards with respect to the flume, the injectors injecting gas or water into the sedimentary layers, wherein the sedimentary layers are changed in pressure and temperature by the gas or water injected from the injectors into the sedimentary layers so that an artificial slope collapse is caused, whereby a water wave is generated in the flume.

The flume may include: a landslide generation portion in which the injectors are installed and the sedimentary layers are collapsed by gas or water supplied from the injectors; a debris generation/flow portion in which the sedimentary layers that have been collapsed in the landslide generation portion flow downwards along a falling gradient and cause sediment entrainment; and a debris deposition portion in which the collapsed sedimentary layers along with the sediment entrainment which have been transferred along the falling gradient in a form of debris flow are deposited as a result from a reduction in mobility of ambient fluid.

Each of the injectors may include: an injection pipe inserted into a corresponding one of a plurality of injection holes formed in the bottom of the flume so as to movable upwards or downwards with respect to the flume; and a valve unit connected to the injection pipe to open or close the injection pipe, wherein the injection holes are arranged at positions spaced apart from each other in lateral and longitudinal directions of the flume.

Furthermore, a first thread may be formed on a circumferential inner surface of each of the injection holes, and a second thread may be formed on a circumferential outer surface of the injection pipe of each of the injectors, the second thread corresponding to the first thread, wherein the injector pipe is moved upwards or downwards with respect to the flume through the corresponding injection hole by threaded-coupling between the first thread of the injection hole and the second thread of the injection pipe.

The apparatus may further include a gas/water supply unit connected to the valve units of the injectors so that, when at least one of the valve units is turned on, gas or water is supplied from the gas/water supply unit into the sedimentary layers.

The apparatus may further include a plurality of landslide generation layers interposed between the sedimentary layers, each of landslide generation layers being made of an unstable material and being thinner than each of the sedimentary layers.

The apparatus may further include a wave height measuring instrument provided on opposite ends of the flume to measure a height of the water wave generated by the collapse of the sedimentary layers.

The apparatus may further include a wave speed measuring instrument provided on opposite sidewalls of the flume to measure a speed of movement of the water wave generated by collapse of the sedimentary layers.

In another aspect, the present invention provides an apparatus for simulating a submarine landslide, including: an inclined flume; a plurality of sedimentary layers stacked on top of one another in the flume, the sedimentary layers being tapped; a plurality of landslide generation layers interposed between the sedimentary layers, each of landslide generation layers being made of an unstable material and being thinner than each of the sedimentary layers; water charged into the flume on the sedimentary layers in such a way that a surface of the water is formed in the flume; and at least one vibration generation unit provided under a bottom of the flume, the vibration generation unit applying vibration to the flume, wherein the sedimentary layers or the landslide generation layers are collapsed by the vibration applied to the flume, thus generating water wave in the flume.

The vibration generation unit may include: a rotary plate provided at a position spaced from a lower surface of the bottom of the flume by a predetermined distance; a rotating shaft provided under a central portion of the rotary plate, the rotating shaft rotating the rotary plate; and a vibration inducer provided on the rotary plate, the vibration inducer pressurizing at least one protrusion provided under the lower surface of the bottom of the flume, wherein the vibration inducer, while rotating, collides with the protrusion to induce the flume to vibrate in a horizontal direction and then pushes the flume upwards to induce the flume to vibrate in a vertical direction.

In a further aspect, the present invention provides a calibration chamber test method for simulating a submarine landslide, including: an injector arrangement operation of moving, upwards or downwards, a plurality of injectors provided in a bottom of an inclined flume and disposing each of the injectors is disposed at a predetermined height in the flume; a sedimentary layer tapping operation of stacking a plurality of sedimentary layers on top of one another in the flume, tapping the sedimentary layers, and interposing a plurality of landslide generation layers between the sedimentary layers; a water surface forming operation of charging water into the flume on the sedimentary layers such that a surface of the water is formed in the flume; a gas/water injection operation of selectively opening or closing each of the injectors to determine a water injection pattern and injecting gas or water into the sedimentary layers or the landslide generation layers; a water wave generation operation of collapsing the sedimentary layers or the landslide generation layers using the gas or water supplied from the injectors, thus generating a water wave in the flume; a wave height measurement operation of measuring, at opposite ends of the flume, a height of the water wave generated by the collapse of the sedimentary layers or the landslide generation layers; and a wave speed measurement operation of measuring, at opposite sidewalls of the flume, a speed of movement of the water wave generated by the collapse of the sedimentary layers or the landslide generation layers.

In yet another aspect, the present invention provides a test method for simulating a submarine landslide, including: a sedimentary layer tapping operation of stacking a plurality of sedimentary layers on top of one another in the flume, tapping the sedimentary layers, and interposing a plurality of landslide generation layers between the sedimentary layers; a water surface forming operation of charging water into the flume on the sedimentary layers such that a surface of the water is formed in the flume; a vibration generating operation of operating a vibration generation unit provided under the bottom of the flume and vibrating the flume; a water wave generation operation of collapsing the sedimentary layers or the landslide generation layers using the vibration of the flume, thus generating a water wave in the flume; a wave height measurement operation of measuring, at opposite ends of the flume, a height of the water wave generated by the collapse of the sedimentary layers or the landslide generation layers; and a wave speed measurement operation of measuring, at opposite sidewalls of the flume, a speed of movement of the water wave generated by the collapse of the sedimentary layers or the landslide generation layers.

As described above, an apparatus and method for simulating a submarine landslide according to the present invention can simulate an actual submarine landslide which is caused by dissociation of gas hydrate or an earthquake and measure the scale of the submarine landslide, the mobility of debris flow, a debris flow deposition pattern and heights and speed of water waves.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
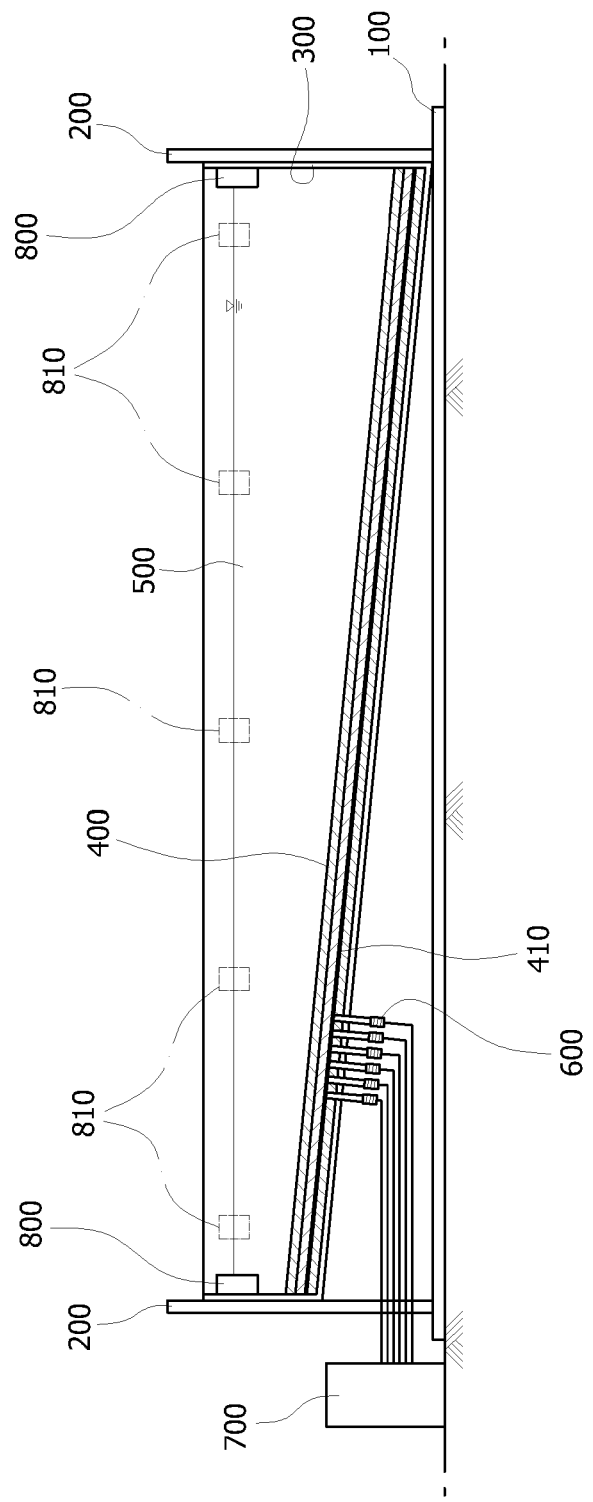
FIG. 1 is a view illustrating the construction of an apparatus for simulating a submarine landslide, according to a first embodiment of the present invention.

Hereinafter, preferred embodiments of the present invention will be described in detail with reference to the attached drawings. Reference now should be made to the drawings, in which the same reference numerals are used throughout the different drawings to designate the same or similar components. If, in the specification, detailed descriptions of well-known functions or configurations would unnecessarily obfuscate the gist of the present invention, the detailed descriptions will be omitted.

FIG. 1 is a view illustrating the construction of an apparatus for simulating a submarine landslide, according to a first embodiment of the present invention.

As shown in FIG. 1, the testing apparatus for simulating a submarine landslide according to the first embodiment of the present invention includes a horizontal frame 100, a vertical frame 200 and an inclined flume 300.

The horizontal frame 100 is disposed under the flume 300 to support the flume 300 thereon.

The vertical frame 200 is connected at a right angle to the horizontal frame 100. Further, the vertical frame 200 is disposed at opposite ends of the flume 300 and connected to the flume 300, thus supporting the opposite ends of the flume 300.

The flume 300 is connected at the opposite ends thereof to the vertical frame 200 and placed on the horizontal frame 100 at a predetermined inclination angle.

In detail, the flume 300 includes a plurality of sedimentary layers 400 which are successively stacked on top of one another, water 500 which is charged into the flume 300 on the sedimentary layers 400, and a plurality of injectors 600 which inject gas or water into the sedimentary layers 400 through the bottom of the flume 300.

Here, gas or water that is injected into the sedimentary layers 400 by the injectors 600 simulates solid-phase gas hydrate, which is formed of gas and water in a methane sedimentary layer of an actual seabed, being dissociated by the effect of ambient temperature and pressure.

The sedimentary layers 400 are formed of sand layers, silt layers, clay layers or a combination thereof. The sedimentary layers 400 are stacked on the bottom of the flume 300 and processed by tapping. When gas or water is injected into the sedimentary layer 400 by the injectors 600, the sedimentary layers 400 are collapsed by the gas or water, whereby water waves can be generated in the flume 300. That is, the sedimentary layer 400 can be collapsed by controlling the injection amount and rate of gas or water and causing the excess pore water pressure in the sedimentary layer 400.

Figure 2A:
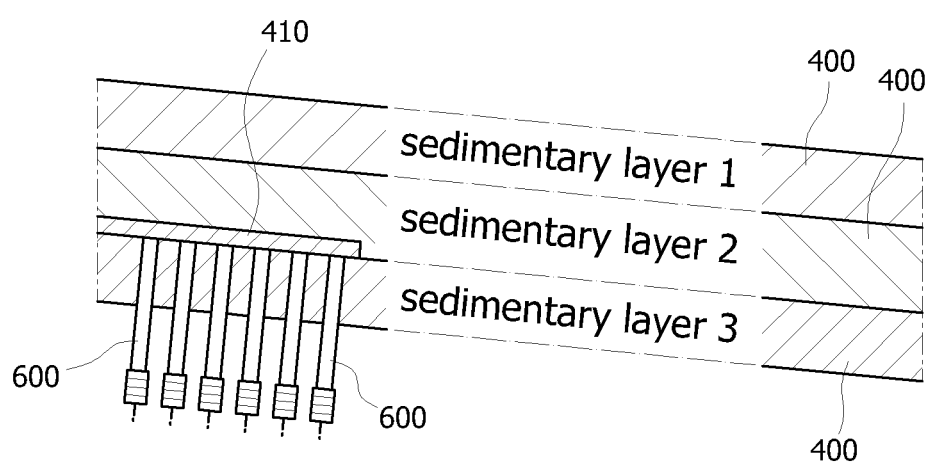
FIGS. 2A and 2B is a view showing arrangement of sedimentary layers and a landslide generation layer of the apparatus according to the first embodiment of the present invention.
Figure 2B:
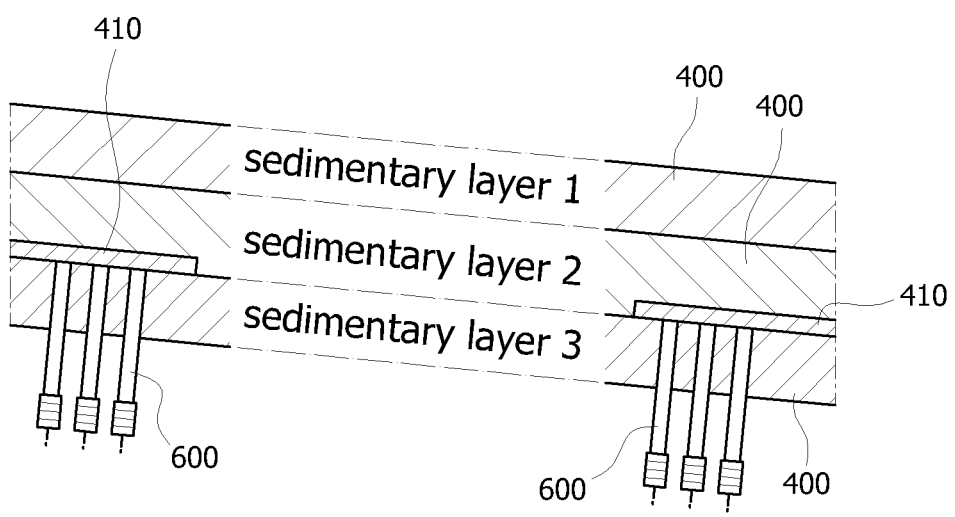

FIGS. 2A and 2B are views showing arrangement of the sedimentary layers 400 and landslide generation layers 410 of the apparatus according to the first embodiment of the present invention.

As shown in FIGS. 2A and 2B, landslide generation layer weak layers 410 are interposed between adjacent sedimentary layers 400. Each landslide generation layer weak layer 410 is thinner than the sedimentary layer 400 and is made of actual gas hydrate or an instable material that has physical characteristics similar to gas hydrate. As shown in FIG. 2A, the landslide generation layers 410 may be concentrated between second and third sedimentary layers 400. Alternatively, as shown in FIG. 2B, the landslide generation layers 410 may be distributed between the third sedimentary layers 400.

According to the present invention, the injectors 600 are arranged under the landslide generation layers 410 at positions spaced apart from each other at regular intervals. When gas or water is injected into the landslide generation layers 410 by the injectors 600, slope collapse of the landslide generation layers 410 can be caused, whereby water waves can be generated. Here, the injection amount and rate of gas or water can be controlled by adjusting a valve unit which is connected to the injectors 600 and will be described later herein. As such, generation of excess pore water pressure which is mainly responsible for a submarine landslide can be simulated by the sedimentary layers 400 and the landslide generation layers 410.

Meanwhile, submarine landslides are caused not only by dissociation of gas hydrate but also by collapse of a gas hydrate layer, which is formed in a deep seabed when, for example, a drill spins through gas hydrate. Therefore, to simulate such a submarine landslide, in the present invention, the simulation of a submarine landslide may be conducted in such a way that an extraction pipe (not shown) which is disposed above the flume 300 is inserted into the sedimentary layers 400 or the landslide generation layers 410 and is used to collapse the sedimentary layers 400 or the landslide generation layers 410.

The water 500 is charged into the flume 300 on the sedimentary layers 400 that has been tapped, such that the water surface is formed in the flume 300.

The injectors 600 pass through the bottom of the flume 300 and are mounted to the flume 300 so as to be movable upwards or downwards so that gas or water can be injected into the sedimentary layers 400 or the landslide generation layers 410 by the injectors 600.

Figure 3:
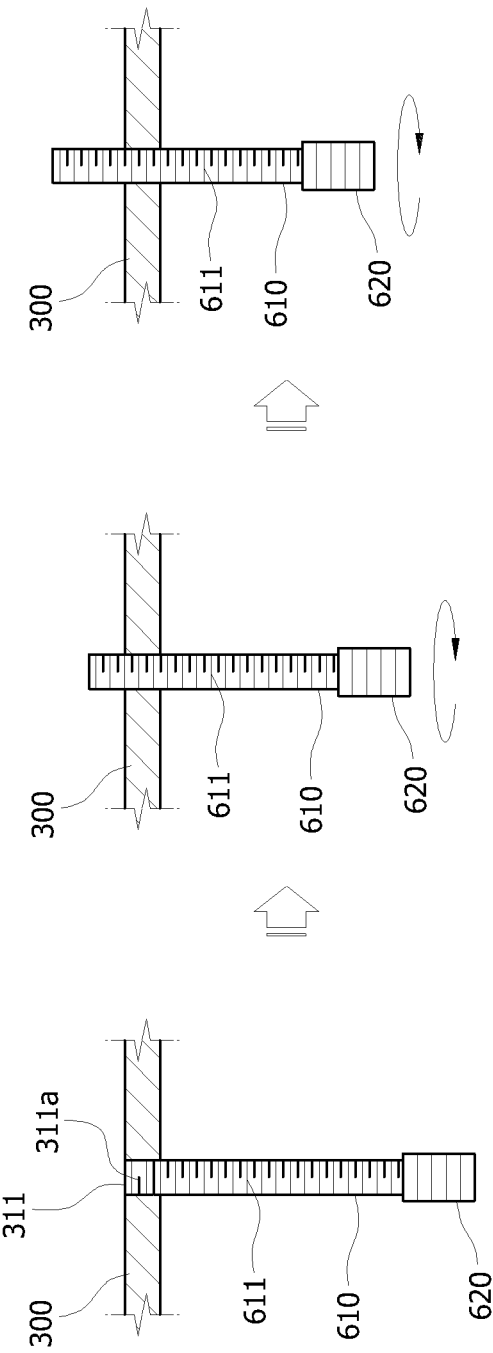
FIG. 3 illustrates the operation of moving an injector through the bottom of a flume according to the present invention.

FIG. 3 illustrates the operation of moving the injector 600 through the bottom of the flume 300 according to the present invention.

In detail, as shown in FIG. 3, each injector 600 includes an injection pipe 610 and a valve unit 620 which is connected to the injection pipe 610 to control opening of the injection pipe 610.

The injection pipes 610 of the injectors 600 are inserted into the respective injection holes 311 which are formed in the bottom of the flume 300. Each injection pipe 610 can be moved upwards or downwards with respect to the flume 300 such that the end of the injection pipe 610 is disposed at a predetermined position in the sedimentary layers 400.

The injection holes 311 are formed at positions spaced apart from each other at regular intervals in the longitudinal and lateral directions of the flume 300. The injection pipes 610 are inserted into the respective injection holes 311 such that they pass through the bottom of the flume 300. Therefore, the injection pipes 610 are also arranged at positions spaced apart from each other at regular intervals in the longitudinal and lateral directions of the flume 300 in the same manner as that of the injection holes 311.

A variety of methods can be used to move each injector 600 upwards or downwards through the bottom of the flume 300. In this embodiment, a first thread 311a is formed on a circumferential inner surface of each injection hole 311, and a second thread 611 corresponding to the first thread 311a is formed on a circumferential outer surface of each injection pipe 610. Thus, the injection pipe 610 can be moved upwards or downwards through the injection hole 311 with respect to the flume 300 by the threaded coupling between the first and second threads 311a and 611.

Figure 4:
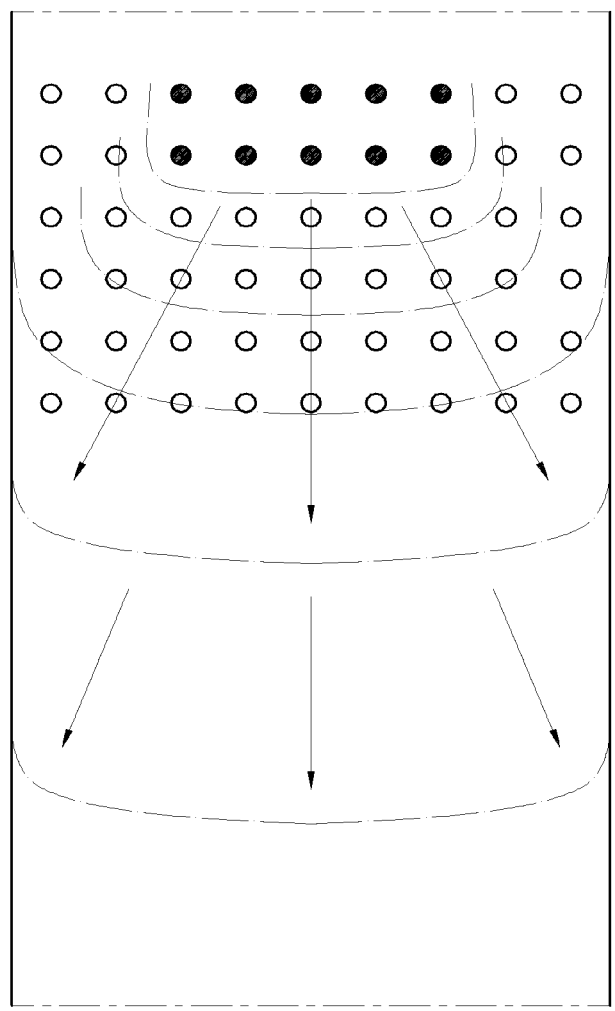
FIGS. 4 and 5 are views showing slip surfaces formed by gas or water injected into the flume by the injectors according to the present invention.
Figure 5:
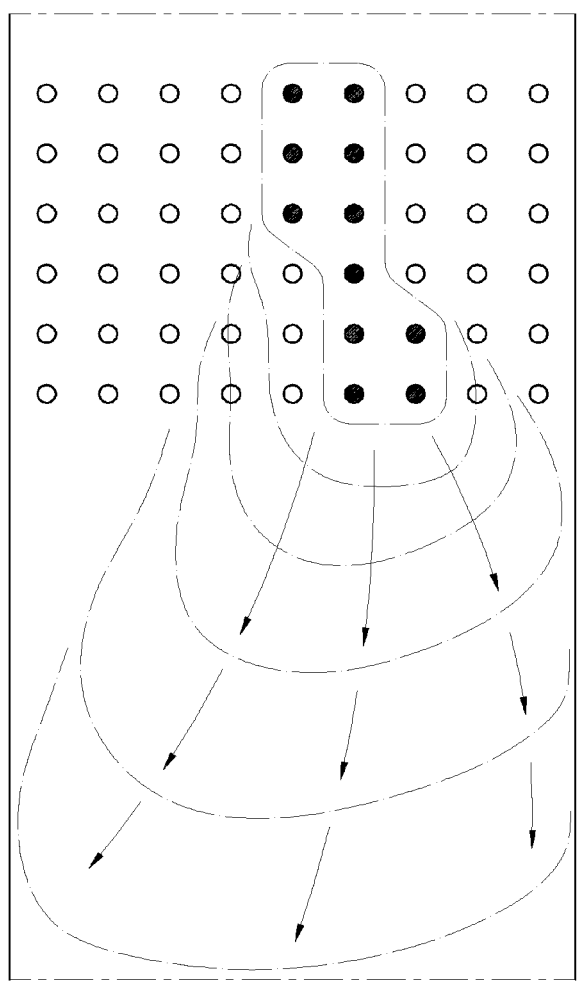

FIGS. 4 and 5 are views showing slip surfaces formed by gas or water injected into the flume 300 by the injectors 600 according to the present invention.

As shown in FIGS. 4 and 5, a pattern in which gas or water is injected from the injectors 600 into sedimentary layers 400 or the landslide generation layers 410 can be changed by selectively opening or closing the valve units that are connected to the respective injection pipes 610. Therefore, in consideration of distribution characteristics of gas hydrate that is present in the deep seabed, whether each of the injectors 600 that are inserted into the sedimentary layers 400 and the landslide generation layers 410 is opened or closed can be set.

Figure 6:
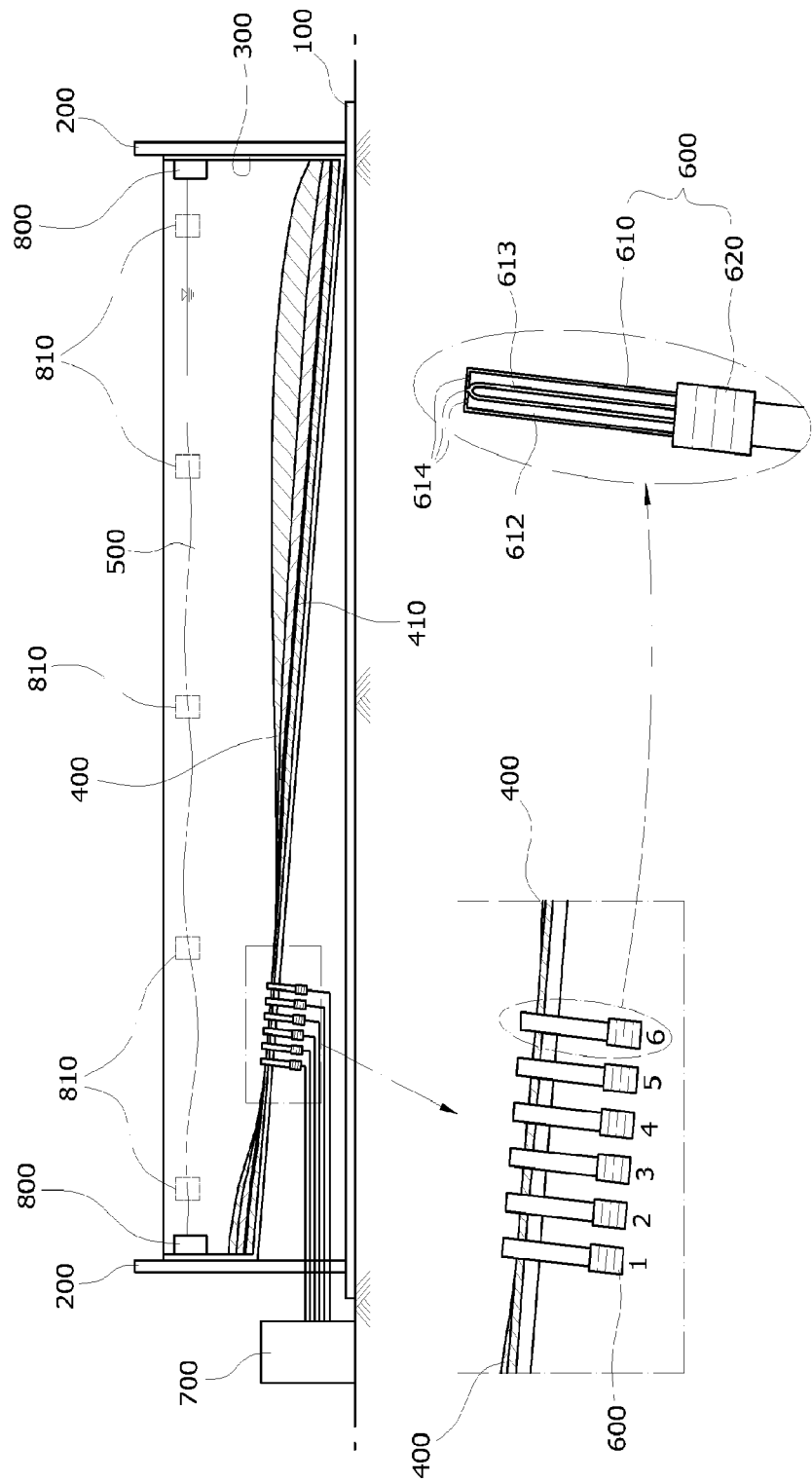
FIG. 6 is a view showing water waves generated in the flume when the sedimentary layers are collapsed by gas or water.
Figure 7:
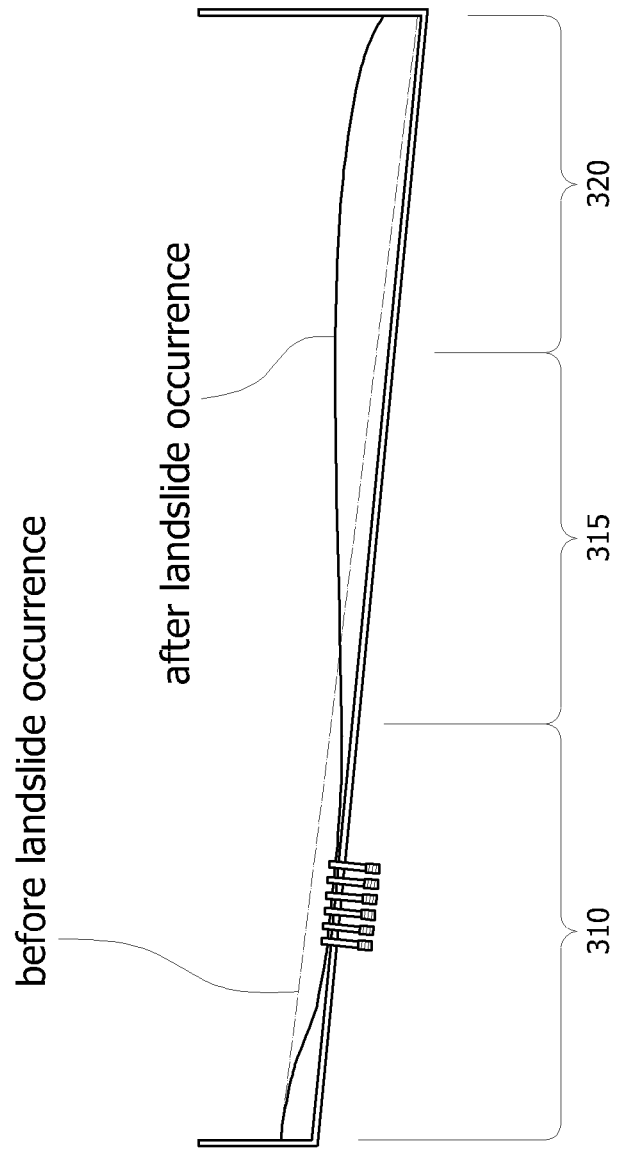
FIG. 7 is a view illustrating a landslide generation portion, a debris generation/flow portion and a debris deposition portion of the flume.

FIG. 6 is a view showing water waves generated in the flume 300 when the sedimentary layers 400 are collapsed by gas or water. FIG. 7 is a view illustrating a landslide generation portion 310, a debris generation/flow portion 315 and a debris deposition portion 320 of the flume 300.

As shown in FIG. 6, when first, second, third and fourth injection pipes 610 of the injectors 600 are closed and fifth and sixth injection pipes 610 are opened, portions of the sedimentary layers 400 or the landslide generation layers 410 that correspond to the fifth and sixth injection pipes 610 are collapsed by gas or water, whereby water waves are generated in the flume 300. Here, each injection pipe 610 includes a first pipe 612 which injects gas into the sedimentary layers 400 or the landslide generation layers 410, and a second pipe 613 which injects water into the sedimentary layers 400 or the landslide generation layers 410. An outlet hole 614 is formed in the end of each pipe 612, 613.

Meanwhile, as shown in FIG. 7, the flume 300 includes a landslide generation portion 310, a debris generation/flow portion 315 and a debris deposition portion 320. The injectors 600 are installed in the landslide generation portion 310. In the landslide generation portion 310, the sedimentary layers 400 are collapsed by gas or water supplied from the injectors 600. In the debris generation/flow portion 315, the sedimentary layers 400 that have been collapsed in the landslide generation portion 310 flow downwards along a falling gradient and cause sediment entrainment. In the debris deposition portion 320, the collapsed sedimentary layers 400 along with the sediment entrainment which have been transferred along the falling gradient in a form of debris flow are eventually deposited as a result of a reduction in mobility of ambient fluid.

In detail, in the landslide generation portion 310, gas or water supplied from the injector 600 makes an excess pore water pressure, which affects the stability of the sedimentary layers 400 that are formed of several different layers, whereby the sedimentary layers 400 can be collapsed. Thereby, the submarine landslide is easily mixed with ambient water and is changed into a form of debris flow. Ultimately, the debris flow is transferred to a basin in the direction of gravity and the flow direction and then deposited on the basin. The debris flow which is formed by the submarine landslide affects a lower part ground of landslide substances that are being transferred while passing through the debris generation/flow portion 315, and causes a sediment entrainment phenomenon. This can simulate a phenomenon in which the volume of the debris deposition portion is much larger than the volume of the initial landslide of the landslide generation portion 310.

Meanwhile, as shown in FIGS. 1 and 3, the present invention may further include a gas/water supply unit 700 which is connected to the valve units 620 of the injectors 600 and supplies gas or water into the sedimentary layers 400 and the landslide generation layers 410 when at least some of the valve units 620 are opened.

Here, the gas/water supply unit 700 supplies gas or water into the sedimentary layers 400 and the landslide generation layers 410 through the injection pipes 610, which are in the open state, so as to simulate dissociation of gas hydrate which is contained in the actual seabed.

Furthermore, the present invention may further include a wave height measuring instrument 800 which is installed on opposite ends of the flume 300. The wave height measuring instrument 800 comprises a camera which monitors the positions of the surfaces of waves, thus measuring the heights of the waves which are generated by collapse of the sedimentary layers 400.

The present invention may further include a wave speed measuring instrument 810 which is provided on opposite sidewalls of the flume 300. The wave speed measuring instrument 801 can measure the speed of movement of water waves generated by collapse of the sedimentary layers 400.

Hereinafter, an apparatus for simulating a submarine landslide according to a second embodiment of the present invention will be described in detail.

Figure 8:
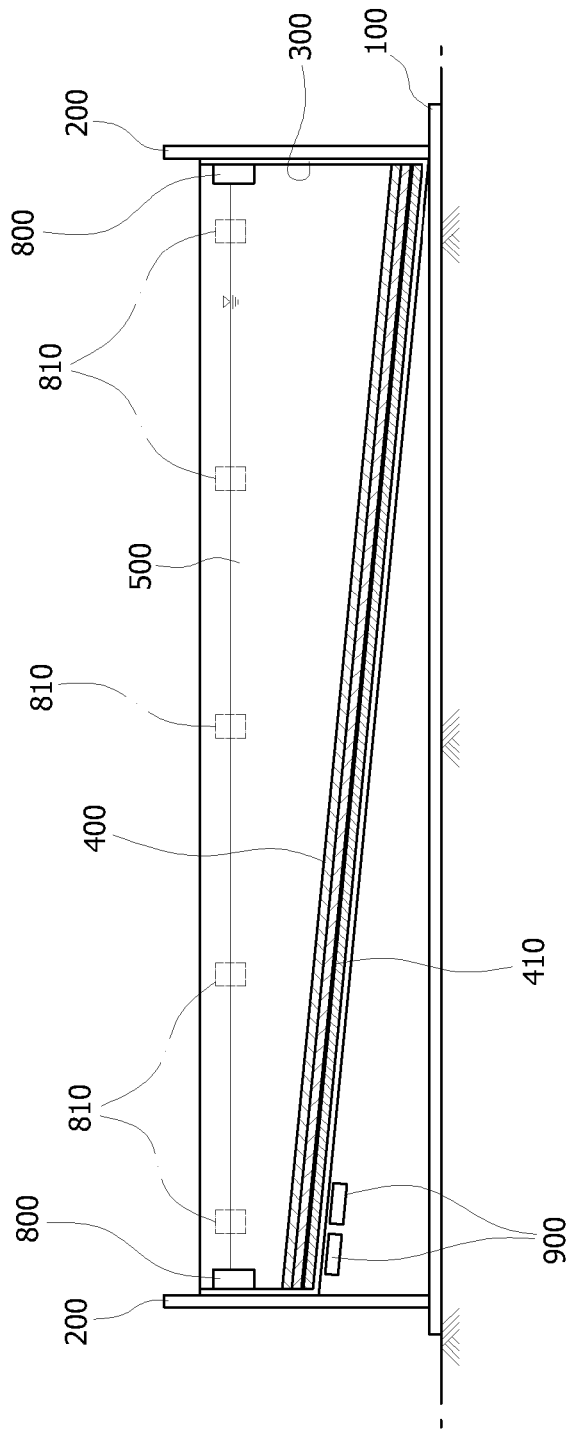
FIG. 8 is a view illustrating the construction of an apparatus for simulating a submarine landslide, according to a second embodiment of the present invention.

FIG. 8 is a view illustrating the construction of the apparatus for simulating a submarine landslide, according to the second embodiment of the present invention.

As shown in FIG. 8, the apparatus according to the second embodiment of the present invention includes a horizontal frame 100, a vertical frame 200 and an inclined flume 300.

The constructions and functions of the horizontal frame 100 and the vertical frame 200 of the second embodiment are the same as those of the apparatus of the first embodiment, therefore detailed explanation is deemed unnecessary.

The flume 300 is connected at opposite ends thereof to the vertical frame 200 and is installed on the horizontal frame 100 at a predetermined inclination angle. The flume 300 includes: a plurality of sedimentary layers 400 which are successively stacked on top of one another; a plurality of landslide generation layers 410 which are interposed between the sedimentary layers 400, and each of which is made of unstable material and is thinner than the sedimentary layer 400; water 500 which is charged into the flume 300 on the sedimentary layers 400; and at least one vibration generation unit 900 which is installed under the bottom of the flume 300 and vibrates the flume 300.

Here, vibrations applied from the vibration generation unit 900 to the flume 300 simulate vibrations generated by an earthquake which occurs in the actual seabed.

The sedimentary layers 400 are formed of sand layers, silt layers, clay layers or a combination thereof. The sedimentary layers 400 are stacked on the bottom of the flume 300 and processed by tapping. The sedimentary layers 400 or the landslide generation layers 410 can be collapsed by vibrations generated in the flume 300. The water 500 is charged into the flume 300 on the sedimentary layer 400 that has been tapped, such that the water surface is formed in the flume 300.

Figure 9:
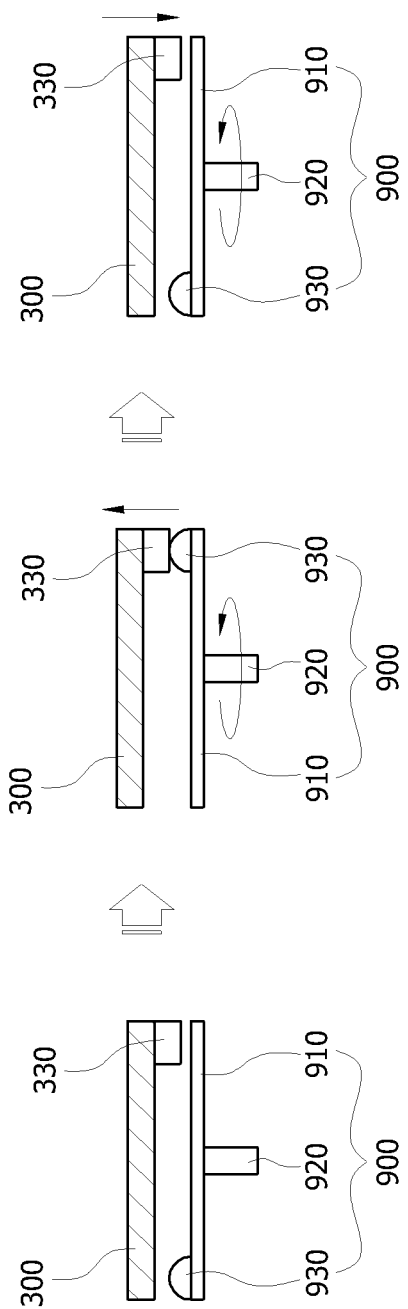
FIG. 9 illustrates the operation of vibrating the flume using a vibration generation unit according to the present invention.

FIG. 9 illustrates the operation of vibrating the flume 300 using the vibration generation unit 900 according to the present invention.

As shown in FIG. 9, a first example of the vibration generation unit 900 includes a rotary plate 910 which is disposed at a position spaced from the bottom of the flume 300 by a predetermined distance, a rotating shaft 920 which is provided under a central portion of the rotary plate 910 and rotates the rotary plate 910, and a vibration inducer 930 which is provided on the rotary plate 910 and pressurizes a protrusion 330 that is provided under the lower surface of the bottom of the flume 300.

The vibration inducer 930 is provided on the upper surface of the rotary plate 910 and may comprise a single vibration inducer 930 or a plurality of vibration inducers 930. The vibration inducer 930, while rotating, collides with the protrusion 330 to induce the flume 300 to vibrate in the horizontal direction and then pushes the flume 300 upwards so that the flume 300 can vibrate in the vertical direction.

The protrusion 330 is provided under the lower surface of the bottom of the flume 300 with a space between it and the upper surface of the rotary plate 910 and may comprise a single protrusion 330 or a plurality of protrusions 330. In this embodiment having the above-mentioned construction, given the size of the indoor calibration chamber test apparatus, a submarine landslide can be simulated in such a way that the size of the protrusion 330 and the rpm of the rotary plate 910 are controlled depending on the magnitude of an earthquake which occurs in the deep seabed or the coastal area.

Figure 10:
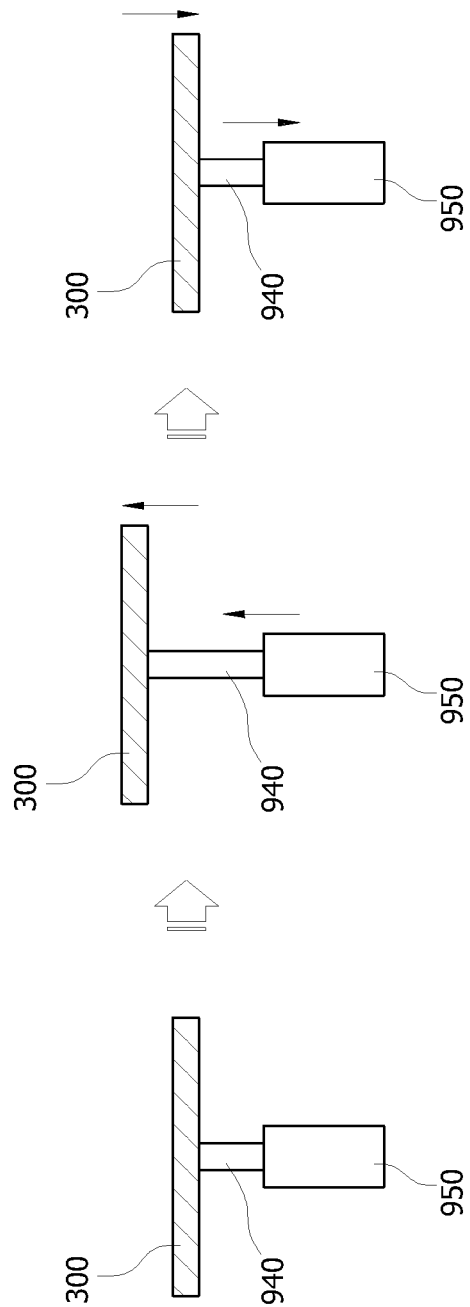
FIG. 10 illustrates the operation of vertically vibrating the flume using another vibration generation unit according to the present invention.

FIG. 10 illustrates the operation of vertically vibrating the flume 300 using another vibration generation unit according to the present invention.

As shown in FIG. 10, a second example of the vibration generation unit 900 includes a hydraulic piston 940 which is connected to the bottom of the flume 300, and a hydraulic cylinder 950 which reciprocates the hydraulic piston 940 to vibrate the flume 300 in the vertical direction.

Hereinafter, a test method for simulating a submarine landslide according to the first embodiment of the present invention will be described in detail.

Figure 11:
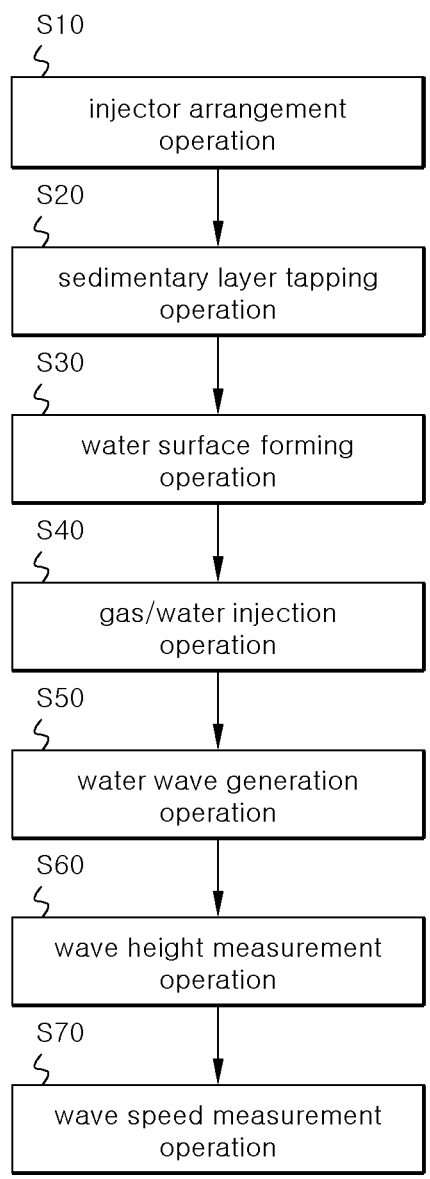
FIG. 11 is a first block diagram showing a test method for simulating a submarine landslide, according to the first embodiment of the present invention.

FIG. 11 is a first block diagram showing the test method for simulating a submarine landslide, according to the first embodiment of the present invention As shown in FIG. 11, the test method according to the first embodiment of the present invention includes an injector arrangement operation S10, a sedimentary layer tapping operation S20, a water surface forming operation S30, a gas/water injection operation S40, a water wave generation operation S50, a wave height measurement operation S60 and a wave speed measurement operation S70.

Depending on conditions of a site, the order of the injector arrangement operation S10 and the sedimentary layer tapping operation S20 may be determined in such a way that the injector arrangement operation S10 is conducted after the sedimentary layer tapping operation S20.

As shown in FIGS. 1 and 3, the injector arrangement operation S10 includes moving each of the injectors 600, which are disposed in the bottom of the inclined flume 300, upwards or downwards and locating the end of each injector 600 at a predetermined height in the flume 300.

The sedimentary layer tapping operation S20 includes successively stacking the sedimentary layers 400 on top of one another in the flume 300 and tapping the sedimentary layers 400. In the sedimentary layer tapping operation S20, the landslide generation layers 410 are interposed between the sedimentary layers 400 before they are tapped.

The water surface forming operation S30 includes charging water 500 into the flume 300 onto the sedimentary layers 400 to form the water surface in the flume 300. The water surface forming operation required to simulate the surface of the sea may be carried out by the injectors 600, provided in the bottom of the flume 300, at a sufficiently slow speed to maintain the stability of the sedimentary layers 400. Alternatively, the water surface forming operation may be conducted in such a way that water is slowly poured into the flume 300 while controlling a water supply rate.

As shown in FIGS. 4 and 5, the gas/water injection operation S40 includes injecting gas or water into the sedimentary layers 400 after a water injection pattern has been determined by opening or closing each injector 600.

As shown in FIG. 6, in the water wave generation operation S50, the sedimentary layers 400 or the landslide generation layers 410 are collapsed by gas or water supplied from the injectors 600, whereby water waves are generated in the flume 300.

In the wave height measurement operation S60, as shown in FIG. 6, the heights of the waves generated by collapse of the sedimentary layers 400 or the landslide generation layers 410 are measured at the opposite ends of the flume 300. In this embodiment, the wave height measurement operation S60 includes using the wave height measuring instrument 800 provided on the opposite ends of the flume 300 so as to measure the heights of the waves.

In the wave speed measurement operation S70, the speed of the waves generated by collapse of the sedimentary layers 400 or the landslide generation layers 410 is measured at the opposite sidewalls of the flume 300. In this embodiment, the wave speed measurement operation S70 includes using the wave speed measuring instrument 810 provided on the opposite sidewalls of the flume 300 to measure the speed of the waves.

Figure 12:
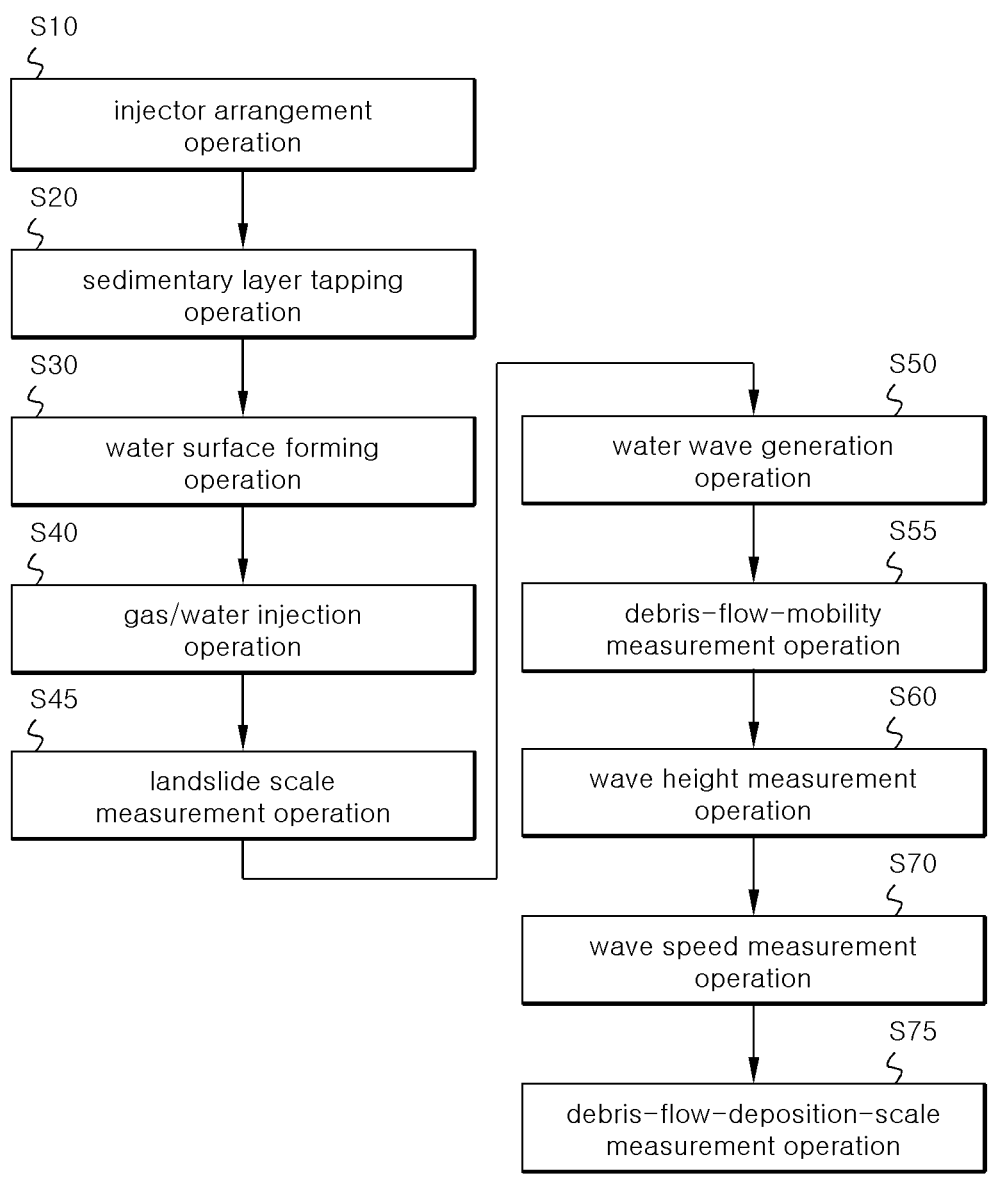
FIG. 12 is a second block diagram showing the test method for simulating a submarine landslide, according to the first embodiment of the present invention.

FIG. 12 is a second block diagram showing the test method for simulating a submarine landslide, according to the first embodiment of the present invention.

As shown in FIG. 12, the test method according to the first embodiment of the present invention includes a landslide scale measurement operation S45, a debris-flow-mobility measurement operation S55 and a debris-flow-deposition-scale measurement operation S75.

The landslide scale measurement operation S45 may be carried out between the gas/water injection operation S40 and the water wave generation operation S50. As shown in FIG. 6, the landslide scale measurement operation S45 includes measuring the scale of a landslide when the sedimentary layers 400 or the landslide generation layers 410 are collapsed by adjusting the supply rate of gas or water injected from the injectors 600 thereinto.

The debris-flow-mobility measurement operation S55 may be conducted between the water wave generation operation S50 and the wave height measurement operation S60. As shown in FIG. 7, the debris-flow-mobility measurement operation S55 includes measuring the degree of the mobility of debris flow that results from the collapse of the sedimentary layers 400 or the landslide generation layers 410.

The debris-flow-deposition-scale measurement operation S75 may be carried out after the wave speed measurement operation S70 has been conducted. The debris-flow-deposition-scale measurement operation S75 includes measuring the scale of debris-flow at a place where the debris-flow that is transferred farthest from the collapse point of the sedimentary layers 400 or the landslide generation layers 410 is deposited.

Hereinafter, a test method for simulating a submarine landslide according to the second embodiment of the present invention will be described in detail.

Figure 13:
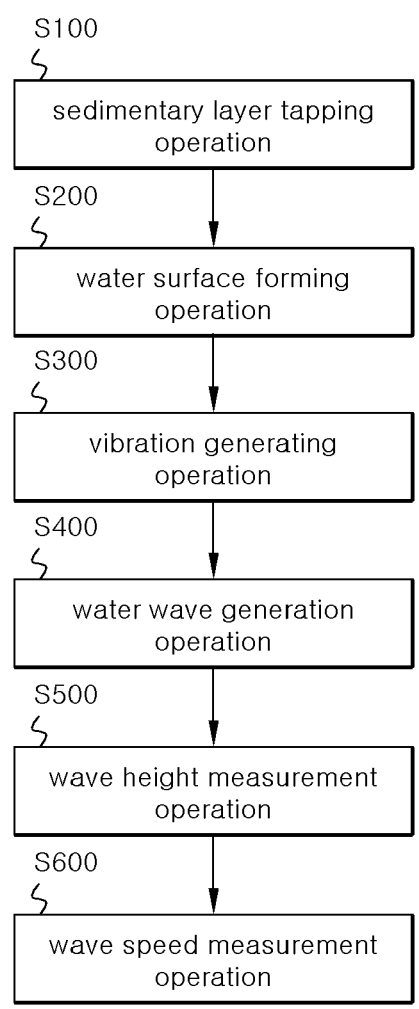
FIG. 13 is a first block diagram showing a test method for simulating a submarine landslide, according to the second embodiment of the present invention.

FIG. 13 is a first block diagram showing a test method for simulating a submarine landslide, according to the second embodiment of the present invention.

As shown in FIG. 13, the test method according to the second embodiment of the present invention includes a sedimentary layer tapping operation S100, a water surface forming operation S200, a vibration generating operation S300, a water wave generation operation S400, a wave height measurement operation S500 and a wave speed measurement operation S600.

As shown in FIG. 8, in the sedimentary layer tapping operation S100, the sedimentary layers 400 are stacked on top of one another in the flume 300 and processed by tapping, and the landslide generation layers 410 are interposed between the sedimentary layers 400.

The water surface forming operation S200 includes charging water 500 into the flume 300 onto the sedimentary layers 400 to form the water surface in the flume 300.

As shown in FIGS. 9 and 10, the vibration generating operation S300 includes operating the vibration generation unit 900 provided under the bottom of the flume 300 so as to generate vibrations.

In the water wave generation operation S400, the sedimentary layers 400 or the landslide generation layers 410 are collapsed by vibrations generated in the flume 300, whereby water waves occur in the flume 300.

In the wave height measurement operation S500, the heights of the waves generated by collapse of the sedimentary layers 400 or the landslide generation layers 410 are measured at the opposite ends of the flume 300.

In the wave speed measurement operation S600, the speed of the waves generated by collapse of the sedimentary layers 400 or the landslide generation layers 410 is measured at the opposite sidewalls of the flume 300.

Figure 14:
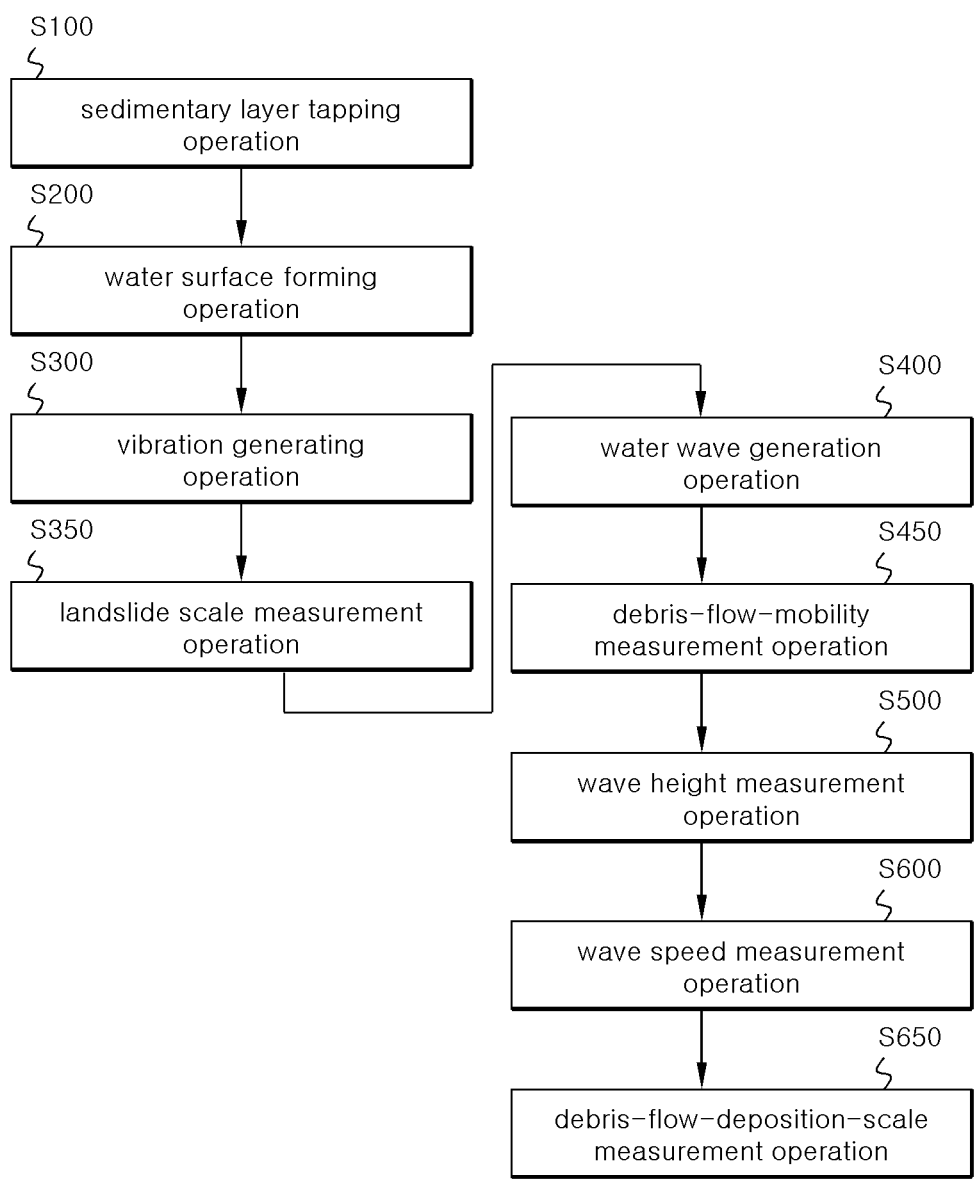
FIG. 14 is a second block diagram showing the test method for simulating a submarine landslide, according to the second embodiment of the present invention.

FIG. 14 is a second block diagram showing the test method for simulating a submarine landslide, according to the second embodiment of the present invention.

As shown in FIG. 14, the test method according to the second embodiment of the present invention further includes a landslide scale measurement operation S350, a debris-flow-mobility measurement operation S450 and a debris-flow-deposition-scale measurement operation S650.

The landslide scale measurement operation S350 may be carried out between the vibration generating operation S300 and the water wave generation operation S400. The landslide scale measurement operation S350 includes measuring the scale of a landslide when the sedimentary layers 400 or the landslide generation layers 410 are collapsed.

The debris-flow-mobility measurement operation S450 may be conducted between the water wave generation operation S400 and the wave height measurement operation S500. The debris-flow-mobility measurement operation S450 includes observing a process, through which the landslide resulting from the collapse of the sedimentary layers 400 or the landslide generation layers 410 makes a debris flow, and measuring the speed of the debris flow.

The debris-flow-deposition-scale measurement operation S650 may be carried out after the wave speed measurement operation S600 has been conducted. The debris-flow-deposition-scale measurement operation S650 includes measuring the scale of debris-flow at a place where the debris-flow that is generated by the collapse of the sedimentary layers 400 or the landslide generation layers 410 is eventually deposited.

As described above, the present invention can simulate an actual submarine landslide which is caused by dissociation of gas hydrate or an earthquake, thereby measuring the scale of the submarine landslide, the mobility of debris flow, a pattern of deposition of the debris flow, the heights of water waves and the speed of the water waves.

Although an apparatus and method for simulating a submarine landslide according to the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for simulating a submarine landslide, comprising:

an inclined flume;

a plurality of sloped sedimentary layers stacked on top of one another in the flume, the sedimentary layers (400) being tapped, and interposed with at least one landslide generation layer (410) therebetween;

water is charged into the flume in such a way that a surface of the water is formed in the flume submerging the sedimentary layers; and a plurality of injectors (600) provided in a bottom of the flume so as to be movable upwards or downwards with respect to the flume, the injectors injecting gas or water into the sedimentary layers, wherein the sedimentary layers are changed in pressure and temperature by the gas or water injected from the injectors into the sedimentary layers so that an artificial slope collapse is caused, whereby a water wave is generated in the flume.

2. The apparatus for simulating a submarine landslide as set forth in claim 1, wherein the flume comprises:

a landslide generation portion in which the injectors are installed and the sedimentary layers are collapsed by gas or water supplied from the injectors;

a debris generation/flow portion in which the sedimentary layers that have been collapsed in the landslide generation portion flow downwards along a falling gradient and cause sediment entrainment; and a debris deposition portion in which the collapsed sedimentary layers along with the sediment entrainment which have been transferred along the falling gradient in a form of debris flow are deposited as a result from a reduction in mobility of ambient fluid.

3. The apparatus for simulating a submarine landslide as set forth in claim 1, wherein each of the injectors comprises:

an injection pipe inserted into a corresponding one of a plurality of injection holes formed in the bottom of the flume so as to movable upwards or downwards with respect to the flume; and a valve unit connected to the injection pipe to open or close the injection pipe, wherein the injection holes are arranged at positions spaced apart from each other in lateral and longitudinal directions of the flume.

4. The apparatus for simulating a submarine landslide as set forth in claim 3, wherein a first thread is formed on a circumferential inner surface of each of the injection holes, and a second thread is formed on a circumferential outer surface of the injection pipe of each of the injectors, the second thread corresponding to the first thread, wherein the injector pipe is moved upwards or downwards with respect to the flume through the corresponding injection hole by threaded-coupling between the first thread of the injection hole and the second thread of the injection pipe.

5. The apparatus for simulating a submarine landslide as set forth in claim 3, further comprising a gas/water supply unit connected to the valve units of the injectors so that, when at least one of the valve units is turned on, gas or water is supplied from the gas/water supply unit into the sedimentary layers.

6. The apparatus for simulating a submarine landslide as set forth in claim 1, further comprising a plurality of landslide generation layers interposed between the sedimentary layers, each of landslide generation layers being made of an unstable material and being thinner than each of the sedimentary layers.

7. The apparatus for simulating a submarine landslide as set forth in claim 1, further comprising
a wave height measuring instrument provided on opposite ends of the flume to measure a height of the water wave generated by the collapse of the sedimentary layers.

8. The apparatus for simulating a submarine landslide as set forth in claim 1, further comprising
a wave speed measuring instrument provided on opposite sidewalls of the flume to measure a speed of movement of the water wave generated by collapse of the sedimentary layers.

9. The apparatus for simulating a submarine landslide, comprising:
an inclined flume;
a plurality of sloped sedimentary layers stacked on top of one another in the flume, the sedimentary layers being tapped, and interposed with at least one landslide generation layer therebetween;
a plurality of landslide generation layers interposed between the sedimentary layers, each of landslide generation layers being made of an unstable material and being thinner than each of the sedimentary layers;
water is charged into the flume in such a way that a surface of the water is formed in the flume submerging the sedimentary layers; and
at least one vibration generation unit provided under a bottom of the flume, the vibration generation unit applying vibration to the flume,
wherein the sedimentary layers or the landslide generation layers are collapsed by the vibration applied to the flume, thus generating water wave in the flume.

10. The apparatus for simulating a submarine landslide as set forth in claim 9, wherein the vibration generation unit comprises:
a rotary plate provided at a position spaced from a lower surface of the bottom of the flume by a predetermined distance;
a rotating shaft provided under a central portion of the rotary plate, the rotating shaft rotating the rotary plate; and
a vibration inducer provided on the rotary plate, the vibration inducer pressurizing at least one protrusion provided under the lower surface of the bottom of the flume,
wherein the vibration inducer, while rotating, collides with the protrusion to induce the flume to vibrate in a horizontal direction and then pushes the flume upwards to induce the flume to vibrate in a vertical direction.

11. A test method for simulating a submarine landslide, comprising:
an injector arrangement operation of moving, upwards or downwards, a plurality of injectors provided in a bottom of an inclined flume and disposing each of the injectors is disposed at a predetermined height in the flume;
a sedimentary layer tapping operation of: stacking a plurality of sloped sedimentary layers on top of one another in the flume; tapping the sedimentary layers; and interposing a plurality of landslide generation layers between the sedimentary layers;
a water surface forming operation of charging water into the flume such that a surface of the water is formed in the flume submerging the sedimentary layers;
a gas/water injection operation of selectively opening or closing each of the injectors to determine a water injection pattern and injecting gas or water into the sedimentary layers or the landslide generation layers;
a water wave generation operation of collapsing the sedimentary layers or the landslide generation layers using the gas or water supplied from the injectors, thus generating a water wave in the flume;
a wave height measurement operation of measuring, at opposite ends of the flume, a height of the water wave generated by the collapse of the sedimentary layers or the landslide generation layers; and
a wave speed measurement operation of measuring, at opposite sidewalls of the flume, a speed of movement of the water wave generated by the collapse of the sedimentary layers or the landslide generation layers.

12. A test method for simulating a submarine landslide, comprising:
a sedimentary layer tapping operation of: stacking a plurality of sloped sedimentary layers on top of one another in the flume; tapping the sedimentary layers; and interposing a plurality of landslide generation layers between the sedimentary layers;
a water surface forming operation of charging water into the flume such that a surface of the water is formed in the flume submerging the sedimentary layers;
a vibration generating operation of operating a vibration generation unit provided under the bottom of the flume and vibrating the flume;
a water wave generation operation of collapsing the sedimentary layers or the landslide generation layers using the vibration of the flume, thus generating a water wave in the flume;
a wave height measurement operation of measuring, at opposite ends of the flume, a height of the water wave generated by the collapse of the sedimentary layers or the landslide generation layers; and
a wave speed measurement operation of measuring, at opposite sidewalls of the flume, a speed of movement of the water wave generated by the collapse of the sedimentary layers or the landslide generation layers.

* * * * *